United States Patent
Dukerschein et al.

(10) Patent No.: US 10,061,131 B2
(45) Date of Patent: Aug. 28, 2018

(54) VIRTUAL-REALITY OR AUGMENTED-REALITY VIEWER FOR A MOBILE ELECTRONIC DEVICE

(71) Applicant: Samsonite IP Holdings S.àr.l., Luxembourg (LU)

(72) Inventors: Jon Karl Dukerschein, San Francisco, CA (US); Bryan Lee Hynecek, Redwood City, CA (US); Kendal Denike, San Francisco, CA (US); Eric Frasch, San Francisco, CA (US); Randy Chiang, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 105 days.

(21) Appl. No.: 14/926,943

(22) Filed: Oct. 29, 2015

(65) Prior Publication Data
US 2017/0123217 A1    May 4, 2017

(51) Int. Cl.
G02B 27/04    (2006.01)
G02B 27/02    (2006.01)
H04B 1/3888   (2015.01)
G02B 27/22    (2018.01)
G02B 27/01    (2006.01)

(52) U.S. Cl.
CPC ......... G02B 27/04 (2013.01); G02B 27/0176 (2013.01); G02B 27/2257 (2013.01); H04B 1/3888 (2013.01)

(58) Field of Classification Search
CPC ............ G02B 27/2257; G02B 27/0176; G02B 27/04; G02B 27/027; G02B 27/028; G02B 27/022; G02B 25/002; G02B 25/004; G02C 5/006; G02C 5/08; G02C 5/2263; G02C 5/22; G02C 3/003; H04N 13/044; G04M 1/026; G04M 1/05; G06T 19/006
See application file for complete search history.

(56) References Cited

U.S. PATENT DOCUMENTS

| | | | | |
|---|---|---|---|---|
| 1,796,432 A | * | 3/1931 | Barlatier ............ | G02B 27/2257 226/68 |
| 2,621,562 A | * | 12/1952 | Stone ................. | G02B 27/2257 359/474 |
| 2017/0090208 A1 | * | 3/2017 | Parker ................ | G02B 27/2257 |
| 2017/0097512 A1 | * | 4/2017 | Haymond .......... | G02B 27/2257 |

* cited by examiner

*Primary Examiner* — Bumsuk Won
*Assistant Examiner* — Ephrem Mebrahtu
(74) *Attorney, Agent, or Firm* — Haug Partners LLP

(57) ABSTRACT

A virtual-reality or augmented-reality viewer (1) for a mobile electronic device (2), the viewer (1) including a central body (3), a left lens (4) and a right lens (4) arranged in the central body (3), a left side body (5) connected to the central body (3), a right side body (5) connected to the central body (3), and a tension mechanism (6) which biases the left and right side bodies (5) towards each other. In a first viewer state, a left portion of the central body (3) is accommodated in the left side body (5) and a right portion of the central body (3) is accommodated in the right side body (5). In a second viewer state, the left portion of the central body (3) is not accommodated in the left side body (5) and the right portion of the central body (3) is not accommodated in the right side body (5), so that the left and right lenses (4) are not covered by the left or right side body (5).

27 Claims, 14 Drawing Sheets

VIRTUAL-REALITY OR AUGMENTED-REALITY VIEWER FOR A MOBILE ELECTRONIC DEVICE

FIELD OF THE INVENTION

The present invention relates to a virtual-reality or augmented-reality viewer for a mobile electronic device.

Sophisticated mobile electronic devices are becoming increasingly common—for example, so-called smartphones such as Apple® iPhone® devices, Samsung Galaxy devices, Motorola DROID™ devices, and the like. Such a mobile device typically includes a display screen with a touch sensitive surface to allow the user to interact with the device. A mobile device may also include one or more of a number of input and output mechanisms—such as microphones, speakers, buttons, knobs, cameras, flashes, light meters—as well as ports for connecting the device to other devices, for example, for syncing the device with a computer, to connect headphones, for connecting the device with a source of charging current, and for communicating wirelessly using an infrared transducer.

Various applications are continually being released for mobile electronic devices, including virtual reality ("VR") or augmented reality ("AR") applications which allow a user to have a three-dimensional virtual-reality or augmented-reality experience. Such applications almost always require a specialized VR or AR viewing apparatus, or viewer, to be used with the mobile device. These viewers attach directly to the mobile device, allowing a user to look through the viewer to the mobile device in order to experience the three-dimensional e of the virtual-reality or augmented-reality application. These viewers typically include one or more lenses. Examples of such viewers include the ZEISS VR ONE, the DODOcase G2, the DODOcase P2, the SAMSUNG Gear VR, the ARCHOS VR Glasses, and the HOMiDO Virtual Reality Headset, to name a few.

But in order to securely hold mobile devices, VR viewers typically surround most of the mobile device, thereby obscuring, if not completely blocking, one or more of the die various input and output mechanisms and ports of the mobile electronic device. Such VR viewers are often also not compact or easily collapsible, making it difficult for a user to take the VR viewer "out and about." And such VR viewers also typically do not provide much protection for their lenses, increasing the potential of the lenses getting scratched or otherwise damaged. Such lens damage is of great concern, since these lenses are needed for the VR viewer to operate correctly. Known viewers are also typically bulky and are not easily collapsed into a easily carried configuration, making them less convenient to use.

SUMMARY OF THE INVENTION

As such, it is desirable to provide an improved viewer suitable for use with mobile devices. In particular, and in one aspect, it is desirable to provide a new virtual-reality or augmented reality viewer for a mobile device that provides increased access to the various input and output mechanisms and ports of a mobile electronic device when the viewer is attached to the mobile device. It is also desirable to provide a new virtual-reality or augmented reality viewer for a mobile device which affords increased viewer portability. In addition, it is desirable to provide a new virtual-reality or augmented reality viewer for a mobile device which delivers increased lens protection when the viewer is not being used.

According to the present invention there is therefore provided a virtual-reality or augmented reality viewer For a mobile device as described by way of example below and in the accompanying claims.

In one embodiment of the invention there is provided a virtual-reality or augmented reality viewer for a mobile electronic device, the viewer including a central body, a left lens and a right lens arranged in the central body, a left side body connected to the central body, a right side body connected to the central body, and a tension mechanism which biases the left and tight side bodies towards each other. The virtual-reality or augmented reality viewer is switchable between a first state where a left portion of the central body is accommodated in the left side body and a right portion of the central body is accommodated in the right side body, and a second state where the left portion of the central body is not accommodated in the left side body and the right portion of the central body is not accommodated in the right side body. In the second state, the left and right lenses are not covered by either the left side body or the right side body, and the left side body and the right side body are each at a non-zero angle to the central body.

Another embodiment provides a viewer for a mobile electronic device, the viewer including a central body, a left lens and a right lens arranged in the central body, a left side body movably connected to the central body, a right side body movably connected to the central body, and a tension mechanism which biases the left and right side bodies towards each other. The viewer is switchable between a first state and a second state. In the first state the left side body covers and overlies a left portion of the central body and at least part of the left lens, and die right side body covers and overlies a right portion of the central body and at least part of the right lens. In the second state the left side body does not cover and overlay the left portion of the central body or the left lens, and is at a non-zero angle to the central body, and the right side body does not cover and overlay the right portion of the central body or the right lens, and is at a non-zero angle to the central body.

In another embodiment, the left lens is at least partially covered by the left side body when the viewer is in the first state.

In yet another embodiment, the right lens is at least partially covered by the right side body when the viewer is in the first state.

In another embodiment, the viewer is configured to hold the mobile electronic device between the left side body and the right side body when the viewer is in the second state.

In a further embodiment, the left side body includes a left-side recess configured to receive a first portion of the mobile electronic device, and the right side body includes a right-side recess configured to receive a second portion of the mobile electronic device.

In yet a further embodiment, the left-side and right-side recesses are formed so as to face each other when the viewer is in die second state.

In another embodiment, the left-side and right-side recesses are configured to hold the mobile electronic device between the left side body and the right side body when the viewer is in the second state, and the screen of the mobile device positioned to face toward and at predetermined distance from the left lens and right lens.

In yet another embodiment, the left side body comprises an opening configured to expose an input mechanism, an output mechanisms, a port, or any combination thereof, of the electronic mobile device when the electronic mobile device is arranged in the viewer.

In a further embodiment, the right side body comprises an opening configured to expose an input mechanism, an output mechanisms, a port, or any combination thereof, of the electronic mobile device when the electronic mobile device is arranged in the viewer.

In yet a further embodiment, the tension mechanism connects with and extends between the left side body and the right side body.

In another embodiment, a left portion of the tension mechanism is attached to a left end of the left side body, a right portion of the tension mechanism is attached to a right end of the right side, body, and the tension mechanism biases the left end of the left side body toward the right end of the tight side body.

In yet another embodiment, the tension mechanism is an elastic or spring-like device.

In a further embodiment, at least one side body of the left side body and the right side body is configured to satisfy the formula:

$$Y_2 = \sqrt{LS^2 + (B-A)^2}$$

where:
$Y_2$ is a distance along the at least one side body between a corresponding lens, nearest to the at least one side body, and a screen of the electronic mobile device when the electronic mobile device is arranged in the viewer;
LS is a shortest distance between the corresponding lens and the screen of the mobile device when the mobile device is arranged in the viewer;
B is a distance between a center of the electronic mobile device and an end of the mobile device which contacts the at least one side body when the electronic mobile device is arranged in the viewer; and
A is a distance between a center of the central body and an end of the central body which connects with the at least one side body when the viewer is in the second state.

In another embodiment, the left side body is configured to satisfy the formula:

$$LY_2 = \sqrt{LLS^2 + (LB-LA)^2}$$

where:
$LY_2$ a distance along the left side body between the left lens and a screen of the electronic mobile device when the electronic mobile device is arranged in the viewer;
LLS is a shortest distance between the left lens and the screen of the mobile device when the mobile device is arranged in the viewer;
LB is a distance between a center of the electronic mobile device and an end of the mobile device which contacts the left side body when the electronic mobile device is arranged in the viewer; and
LA is a distance between a center of the central body and an end of the central body which connects with the left side body when the viewer is in the second state.

In yet another embodiment, the right side body is configured to satisfy the formula:

$$RY_2 = \sqrt{RLS^2 + (RB-RA)^2}$$

where:
$RY_2$ is a distance along the right side body between the right lens and a screen of the electronic mobile device when the electronic mobile device is arranged in the viewer;
RLS is a shortest distance between the right lens and the screen of the mobile device when the mobile device is arranged in the viewer;
RB is a distance between a center of the electronic mobile device and an end of the mobile device which contacts the right side body when the electronic mobile device is arranged in the viewer; and
RA is a distance between a center of the central body and an end of the central body which connects with the right side body when the viewer is in the second state.

In a further embodiment, at least one side body of the left side body and the right side body is configured to satisfy the formula:

$$Y_1 \geq X_2 - \frac{3}{4}Z$$

where:
$Y_1$ is a length of a channel or cavity in the at least one side body in which the corresponding portion of the central body is accommodated in the first state;
$X_2$ is a distance from a center-most edge, nearest to a center of the central body, of a corresponding lens, nearest to the at least one side body, to a corresponding end of the corresponding portion of the central body; and
Z is a diameter of the left lens.

In yet a further embodiment, the at least one side body is configured to satisfy the formula:

$$Y_1 \geq X_2 - \frac{1}{2}Z.$$

In another embodiment, the at least one side body is configured to satisfy the formula:

$$Y_1 \geq X_2$$

In a further embodiment, the left side body is configured to satisfy the formula:

$$LY_1 \geq LX_2 - \frac{3}{4}LZ$$

where:
$LY_1$ a length a channel or cavity in the left side body in which the a portion of die central body is accommodated in the first state;
$LX_2$ is a distance from a center-most edge of tape left lens, nearest to a center of the central body, to a left end of the central body; and
LZ is a diameter of the left lens.

In yet a further embodiment, the left side body configured to satisfy the formula:

$$LY_1 \geq LX_2 - \frac{1}{2}LZ.$$

In another embodiment, the left side body is configured to satisfy the formula:

$$LY_1 \geq LX_2$$

In yet another embodiment, the right side body is configured to satisfy the formula:

$$RY_1 \geq RX_2 - \frac{3}{4}RZ$$

where:
$RY_1$ a length a channel or cavity in the right side body in which the a portion of the central body is accommodated in the first state;
$RX_2$ is a distance from a center-most edge of the right lens, nearest to a center of the central body, to a right end of the central body; and
$RZ$ is a diameter of the right lens.

In a further embodiment, the right side body is configured to satisfy the formula:

$$RY_1 \geq RX_2 - \frac{1}{2}RZ.$$

In yet a further embodiment, the right side body is configured to satisfy the formula:

$$RY_1 \geq RX_2$$

In another embodiment, at least one side body of the left side body and the right side body is configured so that at least 25% of a width of a corresponding lens, nearest to the at least one side body, on a mobile-device-facing side of the viewer is covered by the at least one side body when the viewer is in the first state.

In yet another embodiment, the at least one side body is configured so that at least 50% of the width of the corresponding lens on the mobile-device-facing side of the viewer is covered by the at least one side body when the viewer is in the first state.

In a further embodiment, the at least one side body is configured so that 100% of the width of the corresponding lens on the mobile-device-facing side of the viewer is covered by the at least one side body when the viewer is in the first state.

In yet a further embodiment, the at least one side body is configured so that at least 25% of a width of the corresponding, lens on a user-facing side of the viewer is covered by the at least one side body when the viewer is in the first state.

In another embodiment, the at least one side body is configured so that at least 50% of the width of the corresponding lens on the user-facing side of the viewer is covered by the left side body when the viewer is in the first state.

In a further embodiment, the at least one side body is configured so that 100% of the width of the corresponding lens on the user-facing side of the viewer is covered by the at least one side body when the viewer is in the first state.

In yet a further embodiment, the left side body includes a channel or cavity in which a portion of the central body is accommodated in the first state, and the channel or cavity of the left side body is configured so that at least 25% of a width of the left lens on a mobile-device-facing side of the viewer is covered by the left side body when the viewer is in the first state.

In another embodiment, the channel or cavity of the left side body is con figured so that at least 50% of the width of the left lens on a mobile-device-facing side of the viewer is covered by the left side body when the viewer is in the first state.

In yet another embodiment, the channel or cavity of the left side body is configured so that 100% of the width of the left lens on a mobile-device-facing side of the viewer is covered by the left side body when the viewer is in the first state.

In a further embodiment, the channel or cavity of the left side body is configured so that at least 25% of a width of the left lens on a use facing side of the viewer is covered by the left side body when the viewer is in the first state.

In yet a further embodiment, the channel or cavity of the led side body is configured so that at least 50% of the width of the left lens on a user-facing side of the viewer is covered by the left side body when the viewer is in the first state.

In another embodiment, the channel or cavity of the left side body is configured so that 100% of the width of the left lens on a user-facing side of the viewer is covered by the left side body when the viewer is in the first state.

In yet another embodiment, the right side body includes a channel or cavity in which a portion of the central body is accommodated in the first state, and the channel or cavity of the right side body is configured so that at least 25% of a width of the right lens on a mobile-device-facing side of the viewer is covered by the right side body when the viewer is in the first state.

In a further embodiment, the channel or cavity of the right side body is configured so that at least 50% of the width of the right lens on a mobile-device-facing side of the viewer is covered by the right side body when the viewer is in the first state.

In yet a further embodiment, the channel or cavity of the right side body is configured so that 100% of the width of the right lens on a mobile-device-facing side of the viewer is covered by the right side body when the viewer is in the first state.

In another embodiment, the channel or cavity of the right side body is configured so that at least 25% of a width of the right lens on a user-facing side of the viewer is covered by the right side body when the viewer is in the first state.

In yet another embodiment, the channel or cavity of the right side body is configured so that at least 50% of the width of the right lens on a user-facing side of the viewer is covered by the right side body when the viewer is in the first state.

In a further embodiment, the channel or cavity of the right side body is configured so that 100% of the width of the right lens on a user-facing side of the viewer is covered by the right side body when the viewer is in the first state.

In yet a further embodiment, the central body includes a central cut out located longitudinally between the two lenses, the center cut out being adapted to fit over a user's nose.

In another embodiment, at least one the left side body and the right side body is slidably movable with respect to the central body.

In yet another embodiment, at least one of the left side body and the right side body is pivotally movable with respect to the central body.

In a further embodiment, at least one of the left side body, the right side body, and the central body is made of plastic.

In yet a further embodiment, the mobile device is a mobile phone, smartphone, or tablet computer.

It is noted that the features of the above-described embodiments are not exclusive to each other, and that any one of the above embodiments/features can be combined with one or more of the other embodiments/features to arrive at further embodiments.

The inventive case can be designed to fit a variety of mobile devices—such as smartphones and other portable electronic devices.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity; many other elements which are conventional in this art. Those of ordinary skill in the art will recognize that other elements are desirable for implementing the present invention. However, because such elements are well known in the art, and because they do nor facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

Figure 1:
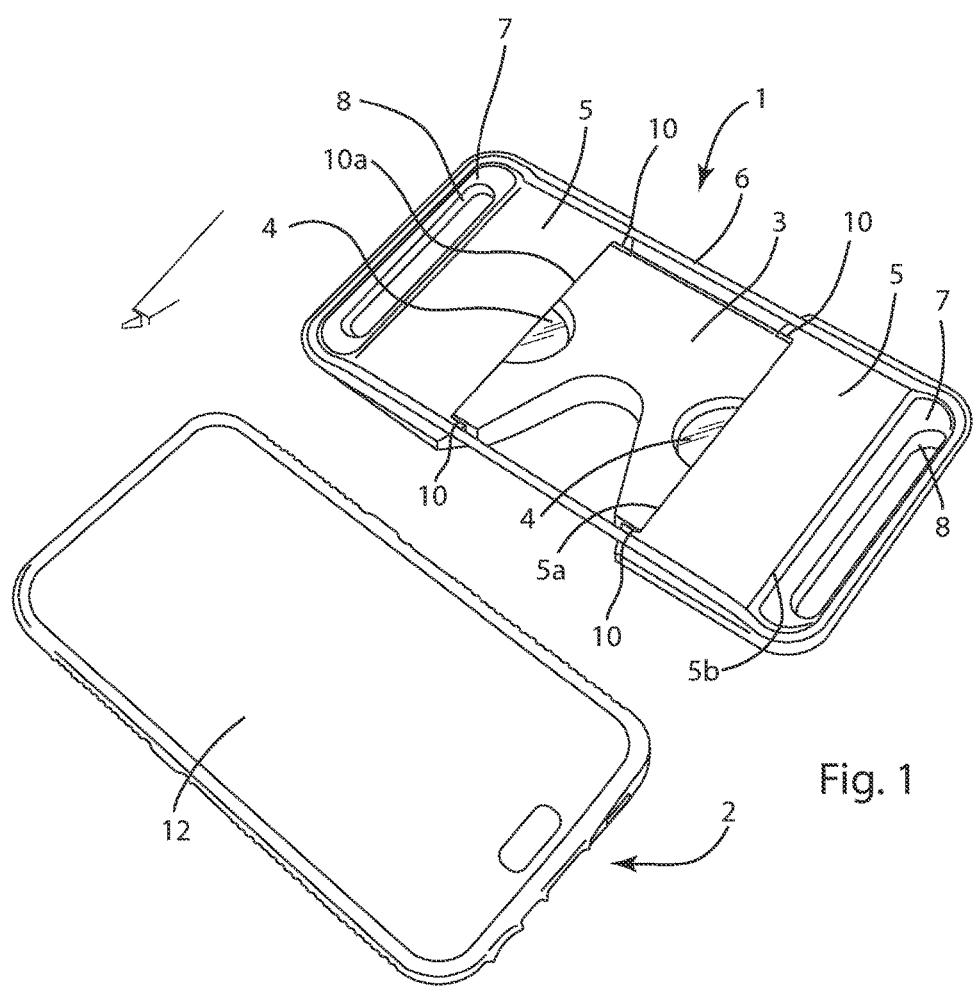
FIG. 1 shows a mobile-device-facing side of a viewer according to an embodiment of the invention in a closed state.

FIG. 1 shows a mobile-device-facing side of a viewer 1 according to an embodiment of the invention in a closed or collapsed state next to an exemplary smartphone 2. The viewer 1 includes a central or main body 3 with lenses 4, two side bodies 5, and a tension mechanism 6. Each of the side bodies 5 includes a recess 7 to receive a portion of an electronic mobile device 2. The recessed portion 7 preferably includes a cutout, opening, or through-hole 8 which exposes at least some of the input/output mechanisms or ports of the mobile device 2 when the viewer 1 is attached to the mobile device 2. Preferably; each of the side bodies 5 covers at least a portion of the mobile-device-facing side of lens 4 when the viewer is in the closed state. More preferably, each of the side bodies 5 covers at least 25% of the mobile-device-facing side of lens 4 when the viewer is in the closed state. Most preferably, each of the side bodies 5 covers 50% to 100% of the mobile-device-facing side lens 4 when the viewer is in the closed state. In the embodiment shown in FIG. 1, the lenses 4 are approximately 50% covered on the mobile-device-facing side by the side bodies 5.

Figure 2:
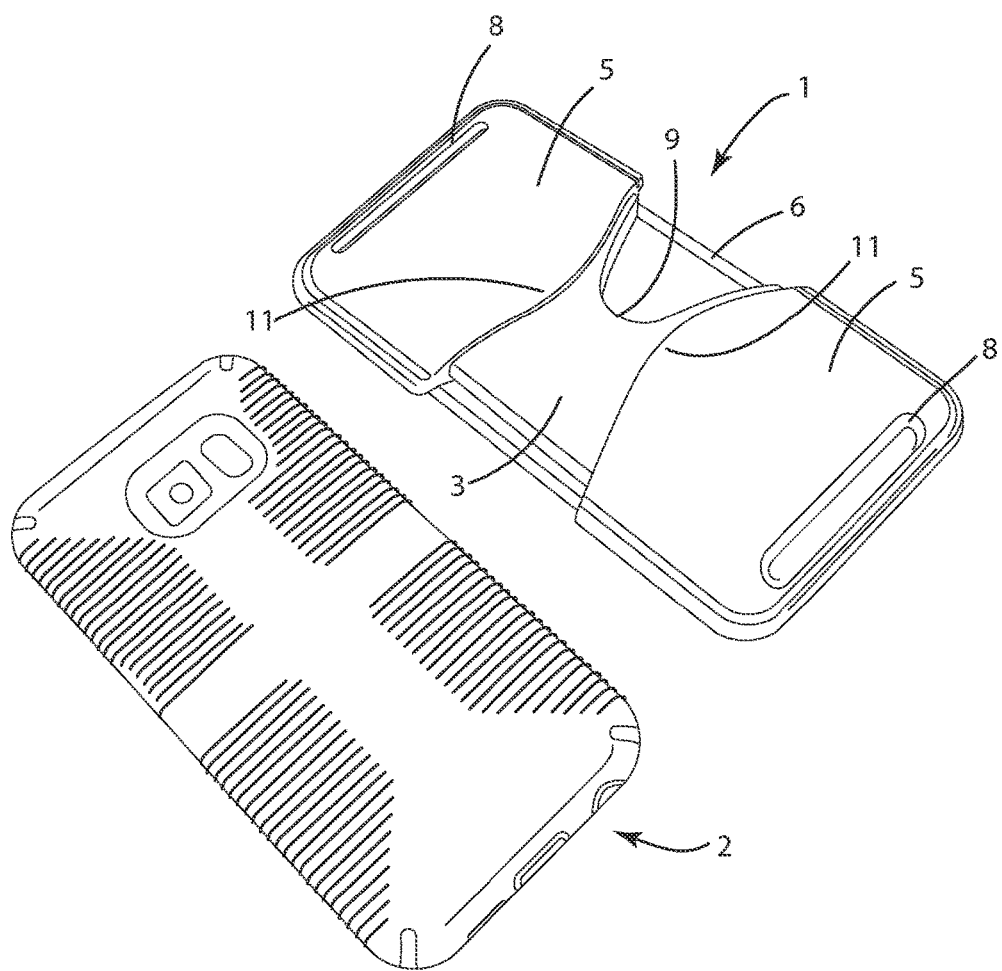
FIG. 2 shows a user-facing side of a viewer according to an embodiment of the invention in a closed state.

FIG. 2 shows a user-facing side of a viewer 1 according to an embodiment of the invention in a closed state. The user-facing side of the main body 3 includes a cutout or recess 9 which accommodates a user's nose when the viewer 1 is positioned in front of the user's eyes when the viewer is being used with the mobile device 2. As described above with respect to the device-facing-side of the viewer preferably, each of the side bodies 5 covers at least a portion of the user-facing side of lens 4 when the viewer is in the closed state. More preferably, each of the side bodies 5 covers at least 25% of the user-facing side of lens 4 when the viewer is in the closed state. Most preferably, each of the side bodies 5 covers 30% to 100% of the user-facing side lens 4 when the viewer 1 is in the closed state. In the embodiment shown in FIG. 2, the lenses 4 are completely covered on the user-facing side by the side bodies 5.

Figure 3:
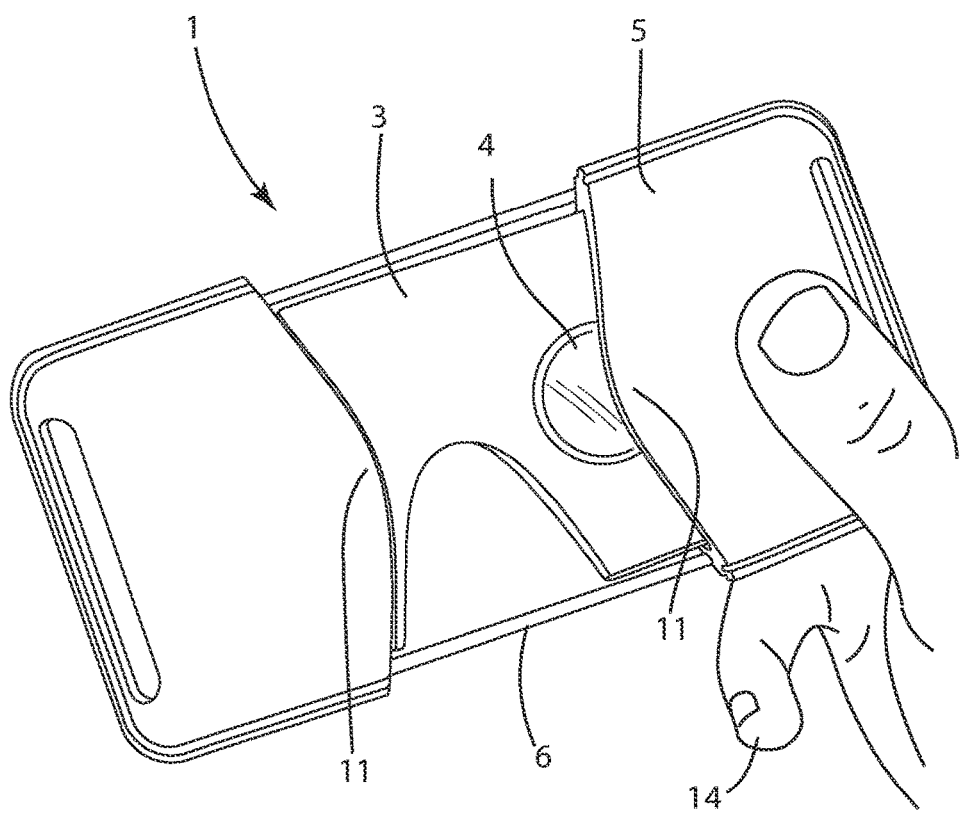
FIG. 3 shows an embodiment of a viewer with one side being transitioned from the closed state to an open state.

FIG. 3 shows an embodiment of the viewer 1 being transitioned form the closed state to an open state. Each side body 5 includes a channel or cavity (not shown) through or in which the main body 3 slides. In the embodiment of FIG. 1, each channel or cavity extends from an inside end 5a of the side body 5 to a portion 5b adjacent to the recessed portion 7. But it is also possible to design the channel or cavity so as to run into and include at least a part of the recess formed by the recess portion 7 (see FIG. 13). The two side bodies 5 are maintained in the closed state by the tension mechanism 6. The tension mechanism 6—such as an elastic band or some other elastic or spring-like device is connected to each of the side bodies 5 so as to pull the side bodies 5 towards each other, thereby maintaining the closed state. To switch the viewer to the open state, a user 14 slide the sides bodies 5 along the main body 3 to expose the lenses 4, as shown in FIG. 3.

Figure 4:
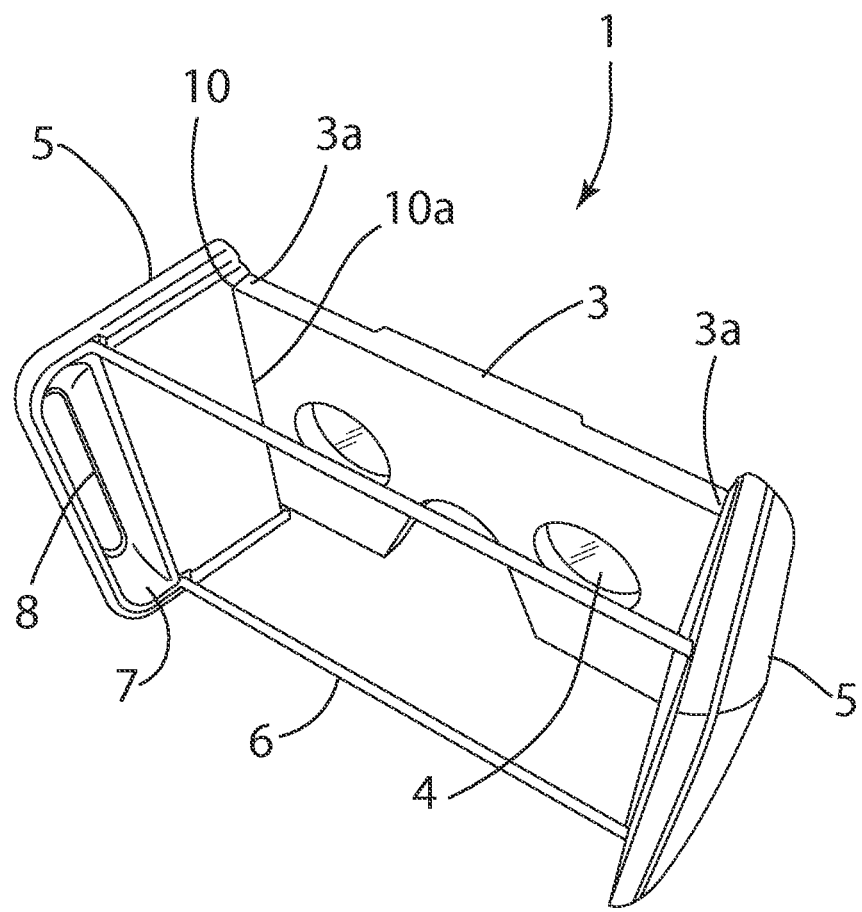
FIG. 4 is a perspective view of a mobile-device-facing side of an embodiment of a viewer in an open state.

FIG. 4 is a perspective view of a mobile-device-facing side of the viewer 1 in an open or expanded state. As shown in FIG. 4, once the side bodies 5 are slid to the ends 3a of the main body 3, the side bodies 5 are then folded or pivoted with respect to the main body 3) in the mobile-device-facing direction so that the recessed portions 7 of the side bodies 5 face each other to receive the mobile device. Each side body 5 may further include one or more notches or cutouts 10 so that a portion lea of the side both 5 rests against a portion of the main body 3, thereby holding the viewer 1 in the open state and limiting how close the tension mechanism 6 can pull the side bodies 5 to each other. In this way, the cutouts 10 and resting portions 10a act as stops which allow the recessed portions of the side bodies 5 to mover closer to each other than a length of the mobile device, but which also prevent the side bodies 3 from moving too close to each other and potentially collapsing. This makes it easy to insert the mobile device 2 into the recessed portions 7 when the viewer 1 is in the open state, while still enabling the viewer 1 to securely retain the mobile device 2.

Figure 5:
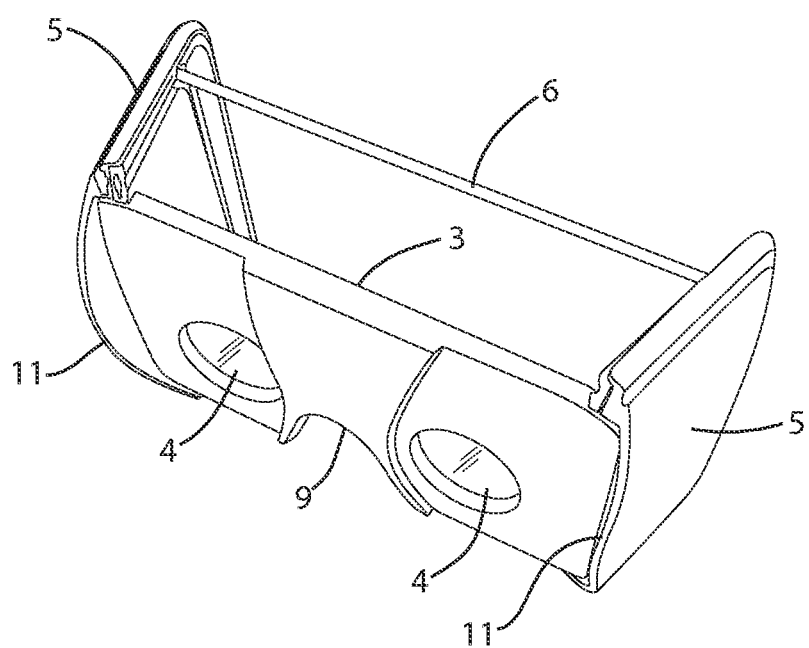
FIG. 5 is a perspective view of a user-facing side of an embodiment of a viewer in an open state.

FIG. 5 is a perspective view of a user-facing side of the viewer 1 in an open state. The cutout or recess 9 which accommodates a user's nose when the viewer 1 is being used with the mobile device 2. In addition, the side bodies 5 may include wings or protrusions 11 which extend away from a user-facing side of the main body 3 so as to at least partially block external light from passing between a user and the sides of the viewer 1 when the viewer 1 is being used. The protrusions 11 of the side bodies 5 can also be designed to cover, and thus protect, the lenses 4 when the viewer 1 is in the closed state, as shown in FIGS. 1 and 2.

To switch the viewer 1 from the open or expanded state shown in FIGS. 4 and 5 back to the closed or collapsed state shown in FIGS. 1 and 2, the side bodies 5 are folded in reverse—back in the user-facing direction—so that the side bodies 5 are parallel and in-line with the main body 3, enabling each side of the main body 3 to slide back into and be accommodated in the channel or cavity in the respective side body 5. The tension mechanism 6 pulls the side bodies 5 toward one another, maintaining the viewer in the closed state. In this way, the viewer 1 can quickly be collapsed and folded flat to be readily portable and fit in a pocket and protect the lenses when not in use, while still enabling the viewer 1 to be easily and quickly switched back to the expanded state for use with a mobile device 2.

Figure 6:
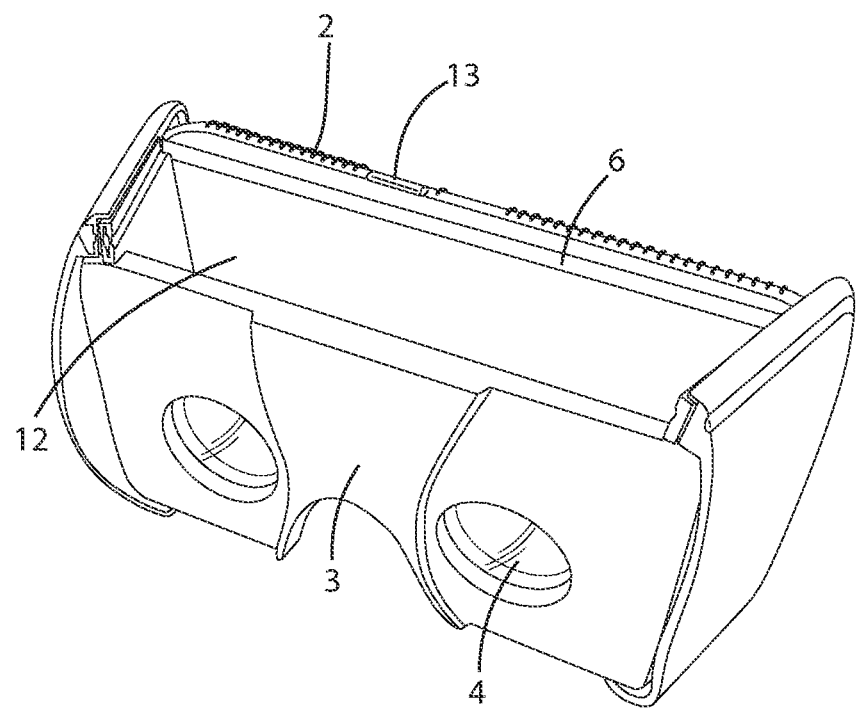
FIG. 6 is a perspective view of a user-facing side of an embodiment of a viewer in an open state with the viewer holding a mobile electronic device.
Figure 7:
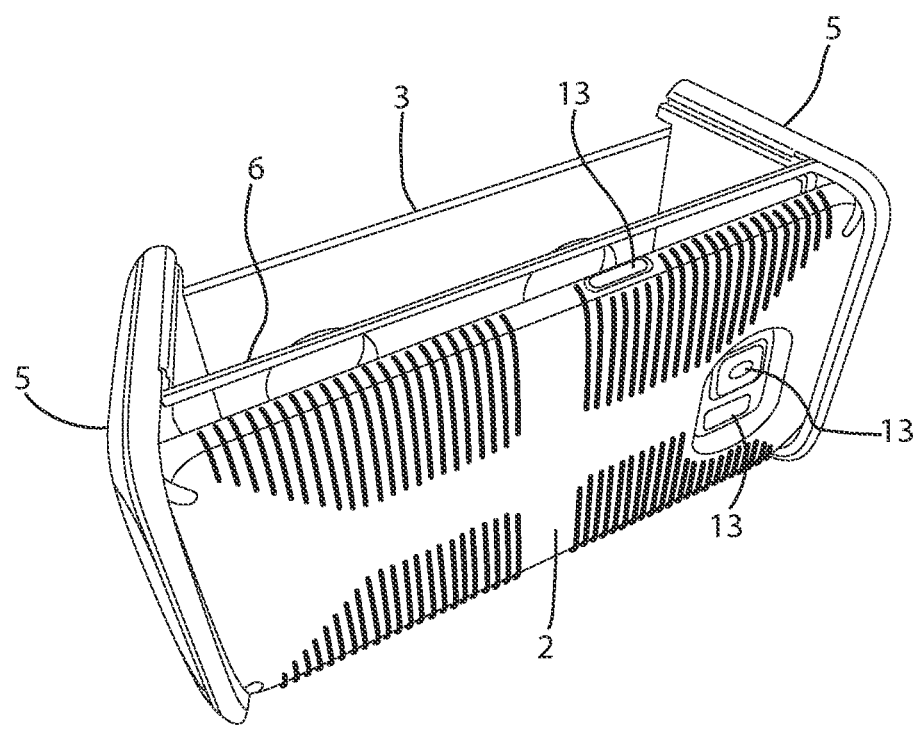
FIG. 7 is a perspective view of a mobile-device-facing side of an embodiment of a viewer in an open state with the viewer holding a mobile electronic device.

FIGS. 6 and 7 are perspective views of a user-facing side and a mobile-device-facing side, respectively, of an embodiment of a viewer 1 in an open state with the viewer 1 holding a mobile electronic device 2. Once the mobile device 2 is arranged in the recessed portions 7 of the side bodies 5, the tension mechanism 6 pulls the side bodies 5 against the mobile device 2 thereby securing the mobile device 2 in the viewer 1. A user may then look through the lenses 4 and view a screen 12 of the mobile device 2 when using a virtual-reality or augmented reality application on the mobile electronic device 2. In addition, since the mobile device 2 is held by only the side bodies 5, various input and output mechanisms and ports 13—such as buttons, cameras, flashes, light meters, and the like—which are located on the mobile device between the side bodies 5 are easily accessible to the user even when the mobile device 2 is arranged in the viewer 1.

Figure 8:
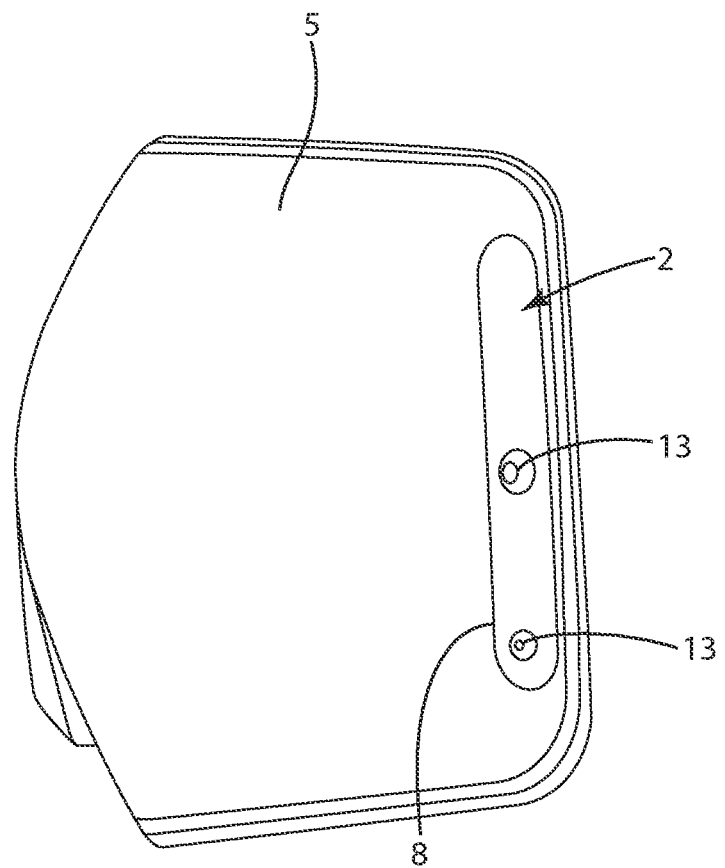
FIG. 8 is a right side view of an embodiment of a viewer in an open state with the viewer holding a mobile electronic device.
Figure 9:
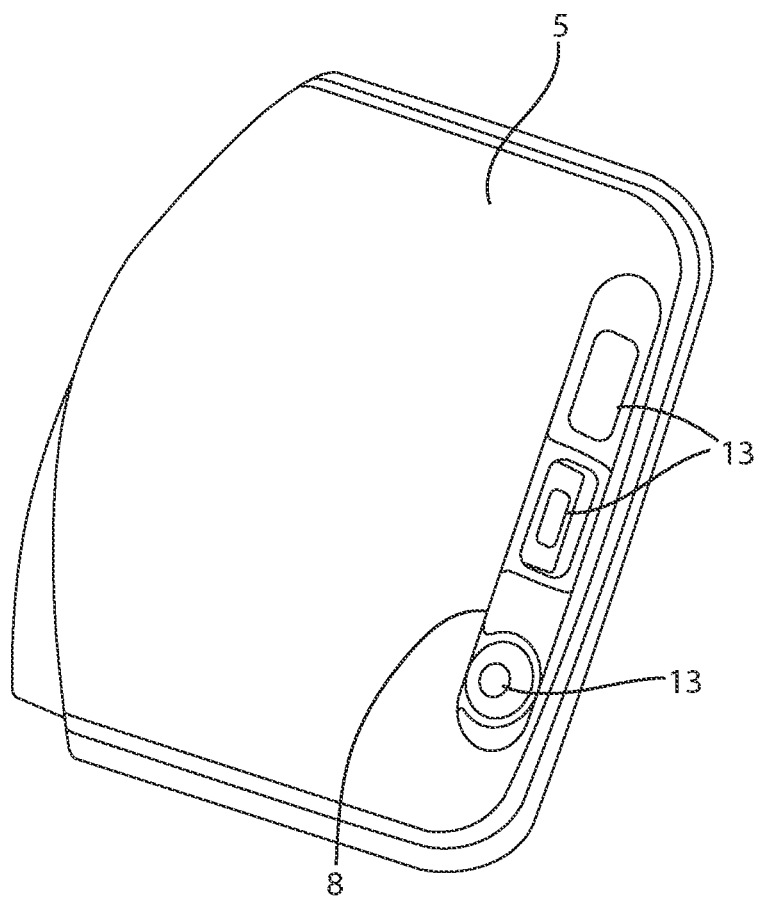
FIG. 9 is a left side view of an embodiment of a viewer in an open state with the viewer holding a mobile electronic device.

Similarly, as shown in FIGS. 8 and 9, the side bodies 5 preferably include openings 8 which provide access to various input/output mechanisms and ports 13—such as speakers, microphones, headphone ports, power input ports, and the like—which are located on the sides of the mobile device which face the side bodies 5 when the mobile device 2 is arranged in the viewer 1.

Figure 10:
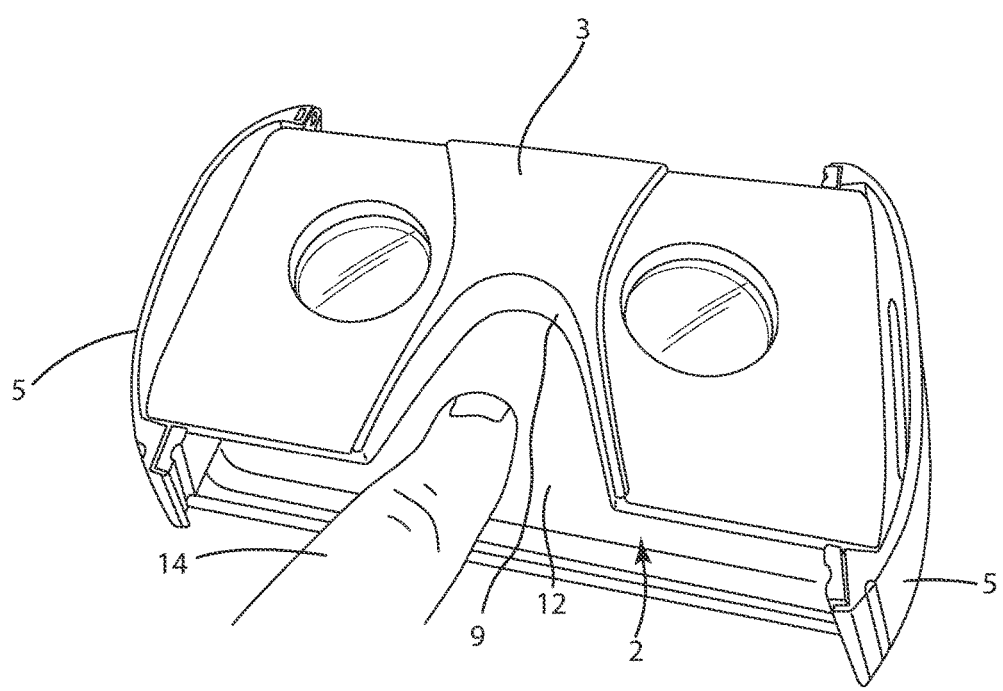
FIG. 10 is a bottom perspective view of a user-facing side of embodiment of a viewer in an open state with the viewer holding a mobile electronic device.
Figure 11:
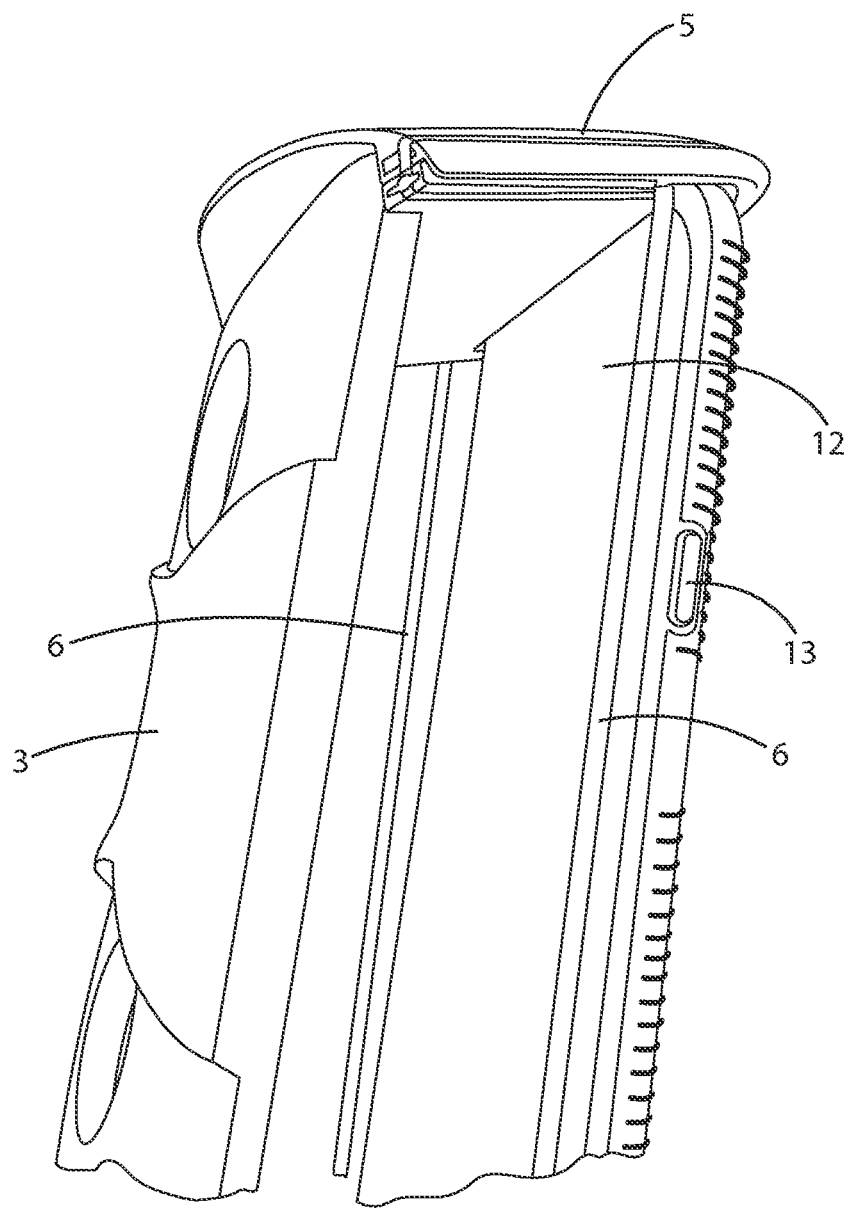
FIG. 11 is a top perspective view of a user-facing side of an embodiment of a viewer in an open state with the viewer holding a mobile electronic device.
Figure 12:
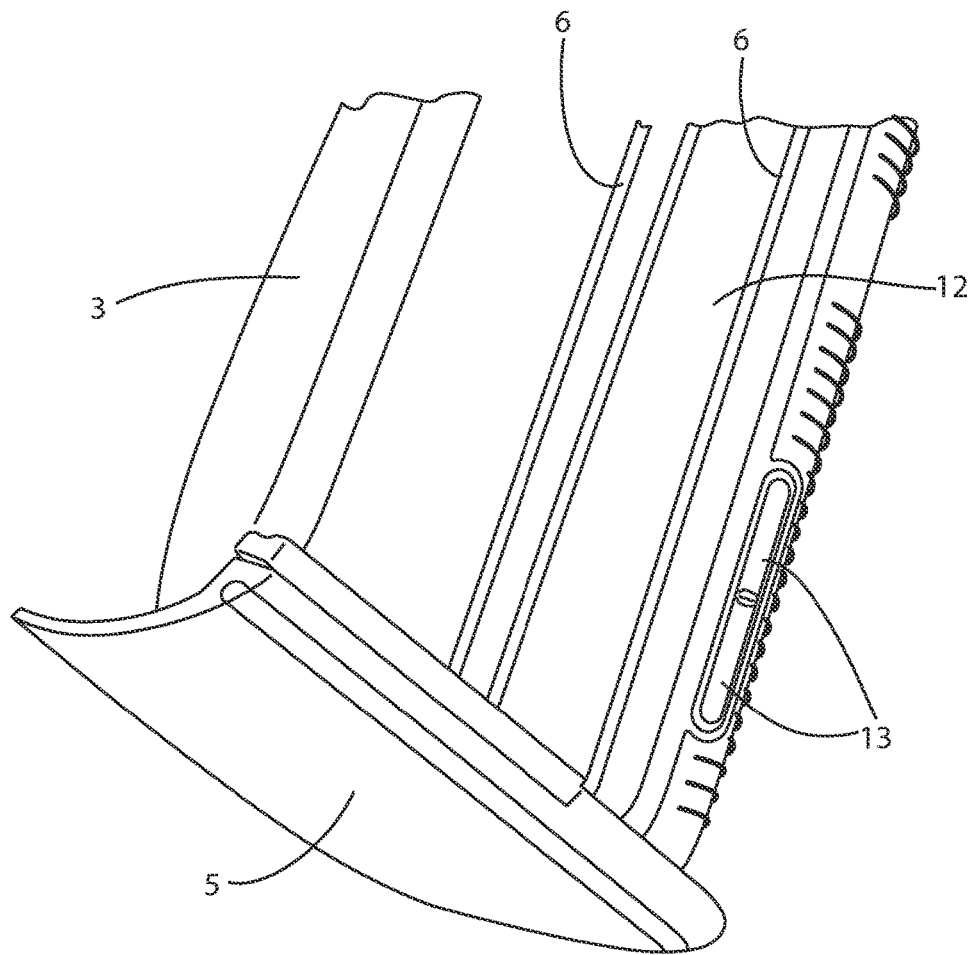
FIG. 12 is a bottom perspective view of a user-facing side of an embodiment of a viewer in an open state with the viewer holding a mobile electronic device.

In addition, as shown in FIGS. 10-42, the above-described open-state configuration of the viewer 1 provides an open gaps at the top (FIG. 11) and bottom (FIGS. 10 and 12) of the viewer 1 between the two side bodies 5, thereby providing direct access to the screen 12 of the mobile device 2 so that a user 14 can directly contact and interact with the screen 12. As shown, the cutout or recess 9 can be designed to extend completely through a thickness of the main body 3 between the user-facing side and the mobile-device-facing side of the main body 3, thereby providing even greater user access to the screen 12 of the mobile device 2.

Figure 13:
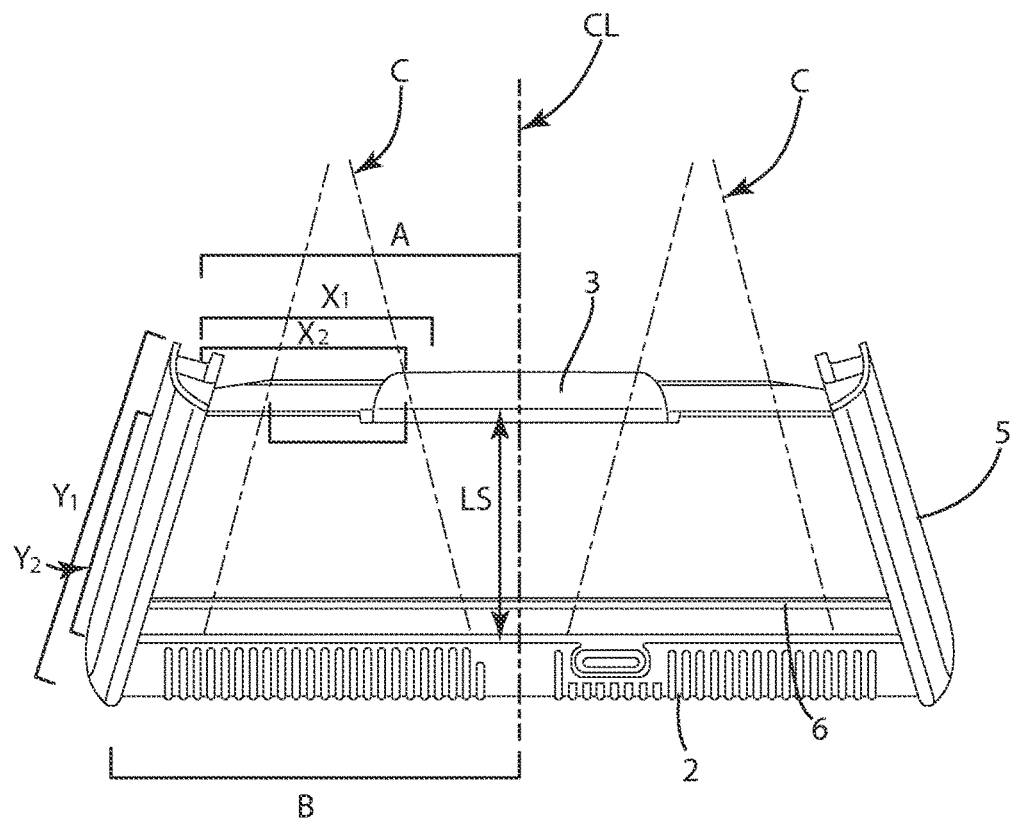
FIG. 13 is a top view of an embodiment of a viewer in an open state with the viewer holding a mobile electronic device.

FIG. 13 is a top view of an embodiment of a viewer 1 in an open state with the viewer 1 holding a mobile electronic device 2. Cones C define a field of view of the viewer 1. According to art embodiment, the lenses 4 of the viewer 1 are configured to each have the sale fixed length and to each have a diameter Z. In one embodiment, the viewer 1 is configured to hold the mobile device 2 so that the distance LS between each lens 4 and the screen 12 of the mobile device 2 corresponds to and is the sale as the focal length of the lens 4, which in one embodiment is preferably from 30-50 mm, more preferably from 35-45 mm, and most preferably approximately 41 mm. In another embodiment, the distance IS and the focal length of the lens 4 is 50 mm or greater, preferably from 50-200 mm, more preferably from 55-150 mm, most preferably 60-100 mm. This is accomplished by placing the recess 7 along the side body 5 at an appropriate distance from the main body 3 (when the viewer 1 is in the open state) so as to fix a distance $Y_2$ along the side body 5 between the lens 4 and screen 12 when the mobile device 2 is arranged in the viewer 1. In particular, if a distance A is a distance between a center of the main body 3 and an end of the main body 3, and a distance B is the distance between a center of the mobile device 2 and an end of the mobile device 2, then the recess 7 should be placed along the side body 5 so that $Y_2$ is set as:

$$Y_2 = \sqrt{LS^2 + (B-A)^2}$$

In addition, if $X_2$ is a distance from a center-most edge of the lens 4, closest to the centerline CL of the main body 3, to a closest side-end edge of the main body 3, and Z is a diameter of the lens 4, then a length $Y_1$ of the channel or cavity in the side body 5 through or in which the main body 3 slides is preferably set so that:

$$Y_1 \geq X_2 - \frac{3}{4}Z$$

More preferably, the length $Y_1$ of the channel or cavity in the side body 5 through or in which the main body 3 slides is set so that:

$$Y_1 \geq X_2 - \frac{1}{2}Z$$

Most preferably, the length $Y_1$ of the channel or cavity in the side body 5 through or in which the main body 3 slides is set so that:

$$Y_1 \geq X_2$$

By fixing the length $Y_1$ of the channel or cavity in the side body 5 as described above, a sufficient length $X_1$ of the main body 3 is accommodated in the channel of cavity in the side body 5 so that at least a portion—preferably at least 25%, more preferably 50% to 100%, and most preferably 100%—of the mobile-device-facing side or the user-facing side of lens 4, or both, is covered when the viewer is in the closed state.

Figure 14:
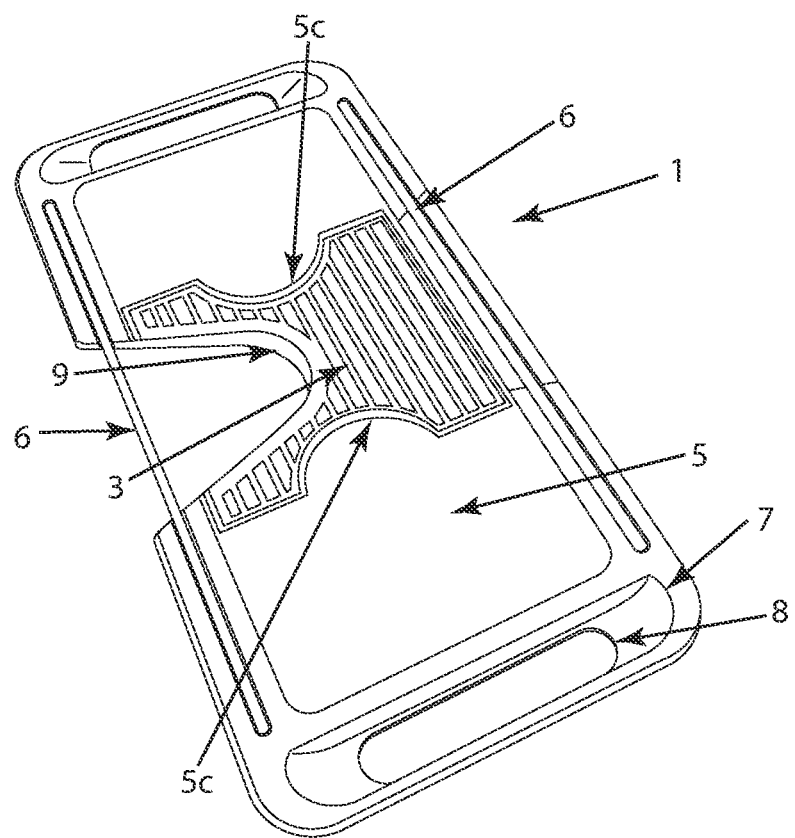
FIG. 14 shows a mobile-device-facing side of a viewer according to another embodiment of die invention in a closed state.

For example, FIG. 1 shows a mobile-device-facing side of a viewer according to an embodiment of the invention where the side bodies 5 are configured so that around 50% of the width of the lens on a mobile-device-facing side of the viewer are covered by the side bodies when the viewer is in the closed state. And FIG. 14 shows a mobile-device-facing side of a viewer according to another embodiment of the invention where the side bodies 5 are configured so that 100% of the width of the lens on a mobile-device-facing side of the viewer are covered by the side bodies, by means of extending portions 5c, when the viewer is in the closed state.

Similarly, FIG. 2 shows a mobile-device-facing side of a viewer according to an embodiment of the invention where the side bodies 5 are configured so that 100% of the width of the lens on a user-facing side of the viewer are covered by the side bodies when the viewer is in the closed state.

It is also preferable that the distance A is less than the distance B. This increases the distance between the recessed portions 7 of the side bodies 5 when the mobile device 2 is arranged in the viewer 1, thereby increasing the force applied by the tension mechanism 6 and better securing the mobile device 2 in the viewer 1. This also makes it easier to design the length $Y_1$ of the channel or cavity in the side body 5 so as to accommodate a sufficient length $X_1$ of the main body 3.

In addition, the focal length of lenses 4, as well as other optical properties of the lenses 4, may be adjusted to accommodate users various vision conditions—such as nearsightedness, farsightedness, astigmatism, etc. The lenses can even be adjusted individually to accommodate a user's specific optical or eyeglass prescription.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior an to the present invention.

The invention claimed is:

1. A viewer for a mobile electronic device, said viewer comprising:
a central body;
a left lens and a right lens arranged in the central body;
a left side body movably connected to the central body;
a right side body movably connected to the central body; and
a tension mechanism which biases the left and right side bodies towards each other;
wherein the viewer is switchable between:
a first state where:
the left side body covers and overlies a left portion of the central body and at least part of the left lens; and
the right side body covers and overlies a right portion of the central body and at least part of the right lens; and
a second state where:
the left side body does not cover and overlay the left portion of the central body or the left lens, and is at a non-zero angle to the central body; and
the right side body does not cover and overlay the right portion of the central body or the right lens, and is at a non-zero angle to the central body; and
wherein the tension mechanism biases the left and right side bodies towards each other when the viewer is in the first state.

2. The viewer according to claim 1;
wherein the left lens is at least partially covered by the left side body when the viewer is in the first state.

3. The viewer according to claim 1;
wherein the right lens is at least partially covered by the right side body when the viewer is in the first state.

4. The viewer according to claim 1;
wherein the viewer is configured to hold the mobile electronic device between the left side body and the right side body when the viewer is in the second state.

5. The viewer according to claim 1;
wherein the left side body includes a left-side recess configured to receive a first portion of the mobile electronic device; and
wherein the right side body includes a right-side recess configured to receive a second portion of the mobile electronic device.

6. The viewer according to claim 5;
wherein the left-side and right-side recesses are formed so as to face each other when the viewer is in the second state.

7. The viewer according to one of claim 6;
wherein the left-side and right-side recesses are configured to hold the mobile electronic device between the left side body and the right side body when the viewer is in the second state; and
wherein the screen of the mobile device positioned to face toward and at predetermined distance from the left lens and right lens.

8. The viewer according to claim 1;
wherein the left side body comprises an opening configured to expose an input mechanism, an output mechanisms, a port, or any combination thereof, of the electronic mobile device when the electronic mobile device is arranged in the viewer.

9. The viewer according to claim 1;
wherein the right side body comprises an opening configured to expose an input mechanism, an output mechanisms, a port, or any combination thereof, of the electronic mobile device when the electronic mobile device is arranged in the viewer.

10. The viewer according to claim 1;
wherein the tension mechanism connects with and extends between the left side body and the right side body.

11. The viewer according to claim 10;
wherein a left portion of the tension mechanism is attached to a left end of the left side body;
wherein a right portion of the tension mechanism is attached to a right end of the right side body; and
wherein the tension mechanism biases the left end of the left side body toward the right end of the right side body.

12. The viewer according to claim 1;
wherein the tension mechanism is an elastic or spring-like device.

13. The viewer according to claim 1;
wherein at least one side body of the left side body and the right side body is configured to satisfy the formula:

$$Y_2 = \sqrt{LS^2 + (B-A)^2}$$

where:
- $Y_2$ is a distance along the at least one side body between a corresponding lens, nearest to the at least one side body, and a screen of the electronic mobile device when the electronic mobile device is arranged in the viewer;
- LS is a shortest distance between the corresponding lens and the screen of the mobile device when the mobile device is arranged in the viewer;
- B is a distance between a center of the electronic mobile device and an end of the mobile device which contacts the at least one side body when the electronic mobile device is arranged in the viewer; and
- A is a distance between a center of the central body and an end of the central body which connects with the at least one side body when the viewer is in the second state.

14. The viewer according to claim 1;
wherein at least one side body of the left side body and the right side body is configured to satisfy the formula:

$$Y_1 \geq X_2 - \frac{3}{4}Z$$

where:
- $Y_1$ is a length of a channel or cavity in the at least one side body in which the corresponding portion of the central body is accommodated in the first state;
- $X_2$ is a distance from a center-most edge, nearest to a center of the central body, of a corresponding lens, nearest to the at least one side body, to a corresponding end of the corresponding portion of the central body; and
- Z is a diameter of the left lens.

15. The viewer according to claim 14;
wherein the at least one side body is configured to satisfy the formula:

$$Y_1 \geq X_2 - \frac{1}{2}Z.$$

16. The viewer according to claim 15;
wherein the at least one side body is configured to satisfy the formula:

$$Y_1 \geq X_2.$$

17. The viewer according to claim 1;
wherein at least one side body of the left side body and the right side body is configured so that at least 25% of a width of a corresponding lens, nearest to the at least one side body, on a mobile-device-facing side of the viewer is covered by the at least one side body when the viewer is in the first state.

18. The viewer according to claim 17;
wherein the at least one side body is configured so that at least 50% of the width of the corresponding lens on the mobile-device-facing side of the viewer is covered by the at least one side body when the viewer is in the first state.

19. The viewer according to claim 18;
wherein the at least one side body is configured so that 100% of the width of the corresponding lens on the mobile-device-facing side of the viewer is covered by the at least one side body when the viewer is in the first state.

20. The viewer according to claim 17;
wherein the at least one side body is configured so that at least 25% of a width of the corresponding lens on a user-facing side of the viewer is covered by the at least one side body when the viewer is in the first state.

21. The viewer according to claim 20;
wherein the at least one side body is configured so that at least 50% of the width of the corresponding lens on the user-facing side of the viewer is covered by the left side body when the viewer is in the first state.

22. The viewer according to claim 21;
wherein the at least one side body is configured so that 100% of the width of the corresponding lens on the user-facing side of the viewer is covered by the at least one side body when the viewer is in the first state.

23. The viewer according to claim 1;
wherein the central body includes a central cut out located longitudinally between the two lenses, the center cut out being adapted to fit over a user's nose.

24. The viewer according to claim 1;
wherein at least one the left side body and the right side body is slidably movable with respect to the central body.

25. The viewer according to claim 1;
wherein at least one of the left side body and the right side body is pivotally movable with respect to the central body.

26. The viewer according to claim 1;
wherein at least one of the left side body, the right side body, and the central body is made of plastic.

27. The viewer according to claim 1;
wherein the mobile device is a mobile phone, smartphone, or tablet computer.

* * * * *